(No Model.)
P. DANSEREAU.
ROLLER BEARING.
No. 532,719. Patented Jan. 15, 1895.
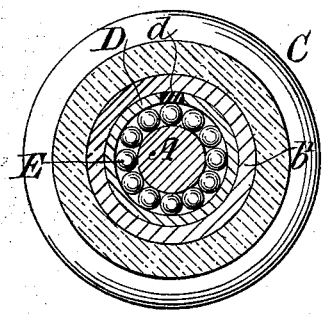
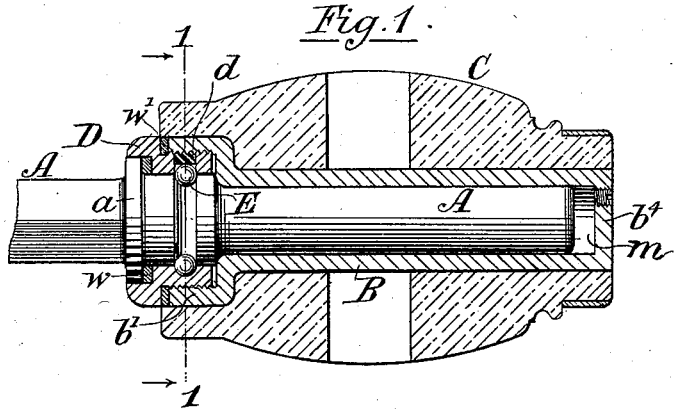
WITNESSES:
Ernest J. Eckersley
Orila Lippe
INVENTOR,
Pierre Dansereau,
BY
Robt. A. Kellond
ATTORNEY.
THE NORRIS PETERS CO., PHOTO-LITHO., WASHINGTON, D. C.

UNITED STATES PATENT OFFICE.

PIERRE DANSEREAU, OF MONTREAL, CANADA.

ROLLER-BEARING.

SPECIFICATION forming part of Letters Patent No. 532,719, dated January 15, 1895.

Application filed January 22, 1894. Renewed November 23, 1894. Serial No. 529,773. (No model.)

*To all whom it may concern:*

Be it known that I, PIERRE DANSEREAU, a subject of the Queen of Great Britain, and a resident of the city of Montreal, in the district of Montreal and Province of Quebec, in the Dominion of Canada, have invented certain new and useful Improvements in Roller-Bearings, of which the following is a specification.

This invention relates more especially, to roller-bearings for carriage axles, but its essential features are applicable to other journals, shafting and the like,—the objects of the improvements being to cheapen and simplify the construction by lessening the number of parts, and to facilitate the fitting of them together and to any ordinary wheel hub, &c., at the same time strengthening and enhancing the anti-friction qualities of the journals and facilitating lubrication.

The present improvements may be regarded as a further development—having in view greater simplicity and efficiency—of the invention shown in my former United States Patent, No. 494,190, dated March 28, 1893, and I will now proceed to describe the same and point out the novel features in the claim, reference also being had to the accompanying drawings forming part of this specification in which similar letters of reference indicate like parts.

In said drawings, Figure 1 is a longitudinal sectional elevation of an axle, bearing and wheel hub embodying one of the simplest forms of my invention. Fig. 2 is a cross-section of same on line 1, 1.

A represents the axle; B, the box or sleeve surrounding the journal, and C any suitable wheel hub mounted upon said box or sleeve. The hub is retained and prevented from rotating upon the box or sleeve B usually by wedging, but I may employ any desired arrangement of fastening devices to secure them together.

I have shown the axle A as having a collar, *a*, formed in one with it, at the inner end of the journal, which collar is embraced by an annular nut D slipped over the axle A from the outer end and when in position abutting against or embracing this collar *a*, and, by means of a screw thread on its periphery extending inward from its outer end, engages with a corresponding thread upon the interior of the enlargement *b'* of the box or sleeve B.

The anti-friction device is, as in my former patent above mentioned, a series of balls, E, inclosed in grooves, but their arrangement is dissimilar as will now be pointed out.

As shown in the drawings, which represent one of the simplest forms of my invention or one more especially applicable for use with light vehicles, I only employ the anti-friction device at the inner end of the journal, an annular groove being here formed upon the journal and a corresponding groove formed directly in the interior of the screwed nut D, the anti-friction balls being inserted through a hole bored through the threaded portion of said nut and such hole afterward closed by a plug *d*, of leather, wood, metal or other desired material, washers, *w, w'* being preferably placed between the nut D and the rim of the enlargement *b'*, and between the nut and the outer face of the collar *a* on the axle.

The box or sleeve B is here made with a closed outer end $b^4$ which may be either finished plain where it appears in the hub as shown in Fig. 1 or finished to represent a nut or cap as may be desired.

A space *m*, between the outer end of the axle and the closed end of the box B serves as an oil-chamber, the lubricant being inserted through a hole afterward stopped with a screwed plug, as shown.

From the above description it will be seen that my anti-friction device is applied only at the inner end of the journal, and, that is to say, the ball-race is formed in direct connection with the axle journal, this arrangement serving to hold the axle in working connection with the box.

Any suitable or well known device may be employed at the outer end of the axle to take up any slack resulting from wear and prevent all lateral movement of the axle.

What I claim, and desire to secure by Letters Patent, is as follows:

The combination, with a hub, and an axle-journal having a fixed collar at its inner end,—of a box or sleeve in rigid connection with the hub, and surrounding said journal,—a nut partially embracing said fixed collar and screwed within the inner end of said box or sleeve, said nut having an annular internal groove formed in the part embraced by said box or sleeve, and a peripheral hole entering said groove, there being a corresponding annular groove formed directly upon the adjacent part of the journal, said grooves together forming a ball-race,—and anti-friction balls occupying such ball-race,—the whole being arranged so that the balls may be inserted through the peripheral hole in the nut and said hole closed by a plug before the nut and journal are connected with the box and hub, substantially as and for the purpose set forth.

Signed at Montreal this 15th day of January, 1894.

PIERRE DANSEREAU.

Witnesses:
ROBT. A. KELLAND,
ERNEST J. ECKERSLEY.